(12) United States Patent
Feng et al.

(10) Patent No.: US 11,409,813 B2
(45) Date of Patent: Aug. 9, 2022

(54) METHOD AND APPARATUS FOR MINING GENERAL TAG, SERVER, AND MEDIUM

(71) Applicant: BEIJING BAIDU NETCOM SCIENCE AND TECHNOLOGY CO., LTD., Beijing (CN)

(72) Inventors: Xinwei Feng, Beijing (CN); Xuping Cao, Beijing (CN); Yilin Zhang, Beijing (CN); Ying Li, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 165 days.

(21) Appl. No.: 16/213,635

(22) Filed: Dec. 7, 2018

(65) Prior Publication Data

US 2019/0220486 A1    Jul. 18, 2019

(30) Foreign Application Priority Data

Dec. 8, 2017    (CN) .......................... 201711294952.9

(51) Int. Cl.
*G06F 16/95*     (2019.01)
*G06F 16/951*    (2019.01)
*G06F 16/9532*   (2019.01)
*G06F 16/955*    (2019.01)

(52) U.S. Cl.
CPC .......... *G06F 16/951* (2019.01); *G06F 16/955* (2019.01); *G06F 16/9532* (2019.01)

(58) Field of Classification Search
CPC ................................................... G06F 16/951
USPC ........................................................ 707/713
See application file for complete search history.

(56) References Cited

U.S. PATENT DOCUMENTS

| 7,010,526 | B2 | 3/2006 | Denesuk et al. | |
| 7,139,764 | B2 | 11/2006 | Lee | |
| 9,436,747 | B1 * | 9/2016 | Baker | G06F 16/254 |
| 2011/0173174 | A1 * | 7/2011 | Flitcroft | G06F 16/951 |
| | | | | 707/707 |
| 2011/0208730 | A1 * | 8/2011 | Jiang | G06F 16/951 |
| | | | | 707/727 |

(Continued)

FOREIGN PATENT DOCUMENTS

| CN | 102298589 A | 12/2011 |
| CN | 103970863 A | 8/2014 |

(Continued)

*Primary Examiner* — Syling Yen
(74) *Attorney, Agent, or Firm* — Knobbe, Martens, Olson & Bear, LLP

(57) ABSTRACT

A method and apparatus for mining a general tag, a server and a medium are disclosed. The method can comprise: matching a tag seed rule containing a tag placeholder and an attribute of the tag placeholder with historical search information to determine a matching tag; combining the existing tag seed rule and the matching tag to construct a new search sequence set; and performing a generalization process on search sequences included in the new search sequence set to obtain a new tag seed rule, and returning to perform the operation of matching the new tag seed rule with the historical search information to determine a new tag until the tag and the tag seed rule satisfy a convergence condition. A more comprehensive and profound tag can be mined, and the entire flow of mining the tag can not be dependent on a vertical website.

16 Claims, 5 Drawing Sheets

(56) References Cited

U.S. PATENT DOCUMENTS

| | | | | |
|---|---|---|---|---|
| 2014/0278985 A1* | 9/2014 | Ramakrishnan | ... | G06Q 30/0256 705/14.54 |
| 2015/0286747 A1* | 10/2015 | Anastasakos | ....... | G06F 16/9017 707/776 |
| 2016/0103822 A1* | 4/2016 | George | ............. | G06F 16/24522 704/9 |
| 2016/0163311 A1* | 6/2016 | Crook | ................... | G10L 15/065 704/275 |
| 2017/0329788 A1* | 11/2017 | Grasselt | ................ | G06F 40/247 |
| 2017/0337209 A1* | 11/2017 | Schaer | ................ | G06F 16/9535 |
| 2017/0374093 A1* | 12/2017 | Dhar | ................... | H04L 63/1433 |
| 2019/0258671 A1* | 8/2019 | Bou | ................... | G06K 9/00751 |
| 2020/0142888 A1* | 5/2020 | Alakuijala | .......... | G06F 16/3338 |

FOREIGN PATENT DOCUMENTS

| | | |
|---|---|---|
| CN | 104995650 A | 10/2015 |
| CN | 105824828 A | 8/2016 |
| CN | 107436922 A | 12/2017 |

* cited by examiner

METHOD AND APPARATUS FOR MINING GENERAL TAG, SERVER, AND MEDIUM

CROSS-REFERENCE TO RELATED APPLICATIONS

This application claims priority to Chinese Patent Application No. 201711294952.9, filed in China on Dec. 8, 2017, which is incorporated herein by reference in its entirety.

TECHNICAL FIELD

Embodiments of the present disclosure relate to the Internet technology, and more specifically to a method and apparatus for mining a general tag, a server and a medium.

BACKGROUND

As the Internet develops, a service platform can support a query form a user for desired resources. At present, when the user queries the resources using a search term, a resource list matching the search term of the user is generally determined by a tag in the search term.

At present, there are two approaches of mining a tag. One approach is an extraction based on the structuralization of a vertical website. For most fields, there are some high-quality vertical websites on the Internet, and common tag attributes have been probably built on the websites, for example, genre of song, type of movie. The other approach is an extraction based on other text attributes of the entity. For example, the tag is mined from an abstract of a movie based on an extraction model constructed according to characteristics such as syntactic structure and dependency relationship.

However, the approach of extracting the tag based on the structuralization of the vertical website cannot be widely used. The approach is not suitable for a situation that unpopular fields do not have vertical websites, or there is no tag attribute on the vertical websites. Moreover, most of the tags mined based on the structuralization of the vertical website are common noun tags, and cannot meet more specific question-answer requirements. For the approach of extracting the tag based on the other text attributes of the entity, since text attributes of the entity are not abundant enough, some subjective tags of the user cannot be mined.

SUMMARY

Embodiments of the present disclosure provide a method and apparatus for mining a general tag, a server, and a medium, to mine a tag for various types of webpages using the same flow, thereby reducing working hours for development, and satisfying specific demands of users.

In a first aspect, the embodiments of the present disclosure provide a method for mining a general tag. The method includes:

matching a tag seed rule containing a tag placeholder and an attribute of the tag placeholder with historical search information to determine a matching tag;

combining the existing tag seed rule and the matching tag to construct a new search sequence set; and performing a generalization process on search sequences included in the new search sequence set to obtain a new tag seed rule, and returning to perform an operation of matching the new tag seed rule and with historical search information to determine a new tag until the tag and the tag seed rule satisfy a convergence condition.

In a second aspect, the embodiments of the present disclosure further provide an apparatus for mining a general tag. The apparatus includes:

a tag matching module, configured to match a tag seed rule containing a tag placeholder and an attribute of the tag placeholder with historical search information to determine a matching tag;

a sequence constructing module, configured to combine the existing tag seed rule and the matching tag to construct a new search sequence set; and a tag updating module, configured to perform a generalization process on search sequences included in the new search sequence set to obtain a new tag seed rule, and return to perform an operation of matching the new tag seed rule with the historical search information to determine a new tag until the tag and the tag seed rule satisfy a convergence condition.

In a third aspect, the embodiments of the present disclosure further provide a server. The server includes:

one or more processors; and a storage device, configured to store one or more programs, wherein the one or more programs, when executed by the one or more processors, cause the one or more processors to implement the method for mining a general tag provided by any embodiment of the present disclosure.

In a fourth aspect, the embodiments of the present disclosure further provide a computer readable storage medium storing a computer program. The program, when executed by a processor, implements the method for mining a general tag provided by any embodiment of the present disclosure.

In the embodiments of the present disclosure, the method includes matching the tag seed rule containing the tag placeholder and the attribute of the tag seed rule with the historical search information to determine the matching tag; combining the existing tag seed rule and the matching tag to construct the new search sequence set; and performing the generalization on the search sequences included in the new search sequence set to obtain the new tag seed rule, and returning to perform an operation of matching the new tag seed rule with the historical search information to determine the new tag until the tag and the tag seed rule satisfy the convergence condition. Therefore, a more comprehensive and profound tag can be mined, and the entire flow of mining the tag is not dependent on a vertical website, and thus, tags of all entities in all fields may be mined using the same flow, which significantly reduces working hours for development, and satisfies specific demands of users.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the present disclosure are shown in the accompanying drawings.

Embodiment 1

Figure 1:
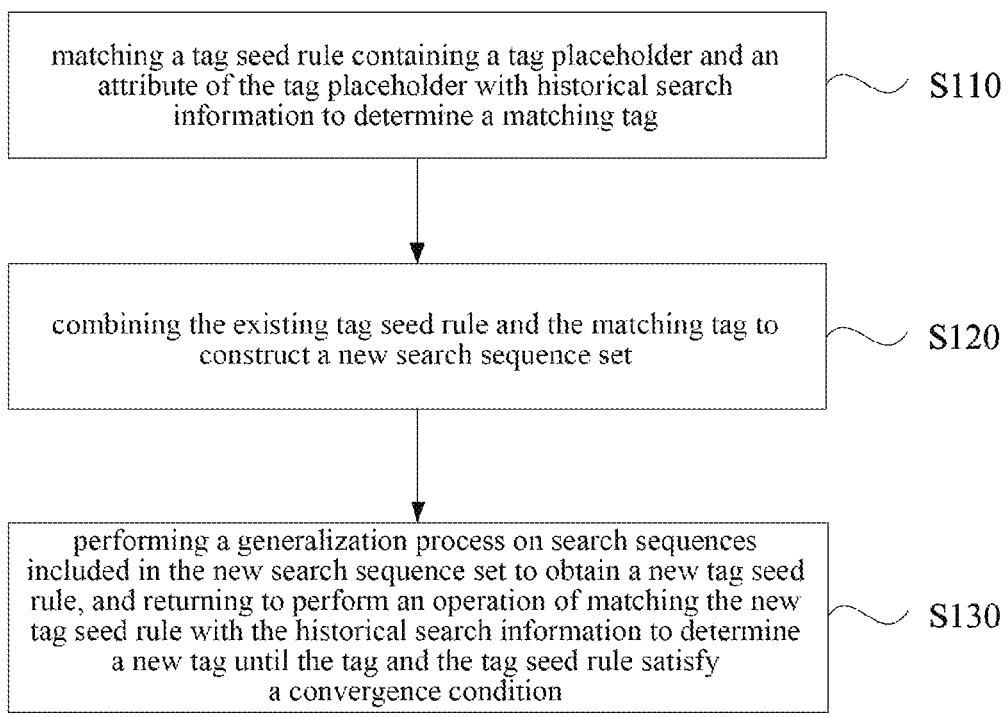
FIG. 1 is a flowchart of a method for mining a general tag according to Embodiment 1 of the present disclosure.

FIG. 1 is a flowchart of a method for mining a general tag according to Embodiment 1 of the present disclosure. This embodiment may be suitable for situations where tags are mined for different fields, different entities, and websites of various types. The method may be performed by an apparatus for mining a general tag, and the apparatus for mining a general tag may be implemented by means of software and/or hardware. For example, the apparatus for mining a general tag may be configured in a server. As shown in FIG. 1, the method includes the following steps.

S110, matching a tag seed rule containing a tag placeholder and an attribute of the tag placeholder with historical search information to determine a matching tag.

In this embodiment, in a knowledge graph a tag is used to describe an attribute of an entity characteristic. For a product, the tag is generally used to satisfy questions and answers for general requirements. For example, "love" in "movies about love" is a tag. In addition, the tag may also be more widely defined. In addition to a common noun such as the "love" described above, the tag may also be a phrase, for example, "music suitable for a broken heart," and "suitable for a broken heart" is a tag. The tag may also be a complete sentence including a subject, a predicate, and an object, for example, "a novel in which a main character is a vampire," and "a main character is a vampire" is a tag.

A placeholder is a symbol, representing that a fixed place is held in advance and content may be added to the place. In this embodiment, the tag placeholder may be a symbol for holding a place for the tag. The attribute of the tag placeholder defines the attribute of the tag which may be a part of speech or phrase structure. Generally speaking, according to parts of speech, words may be divided into two categories: content words and function words. The content words are words representing actual meanings, and include: nouns, verbs, adjectives, numerals, measure words, and pronouns. The function words are words representing grammatical meanings rather than the actual meanings, and include: adverbs, prepositions, conjunctions, auxiliary words, interjections, and onomatopoetic words. According to phrase structures, phrases include a subject-predicate phrase, an endocentric phrase, a verb-object phrase, a coordinate phrase, a predicate-complement phrase, a preposition-object phrase, a "De" phrase, and the like. By taking "love" mentioned above as an example, the attribute of the tag placeholder is noun.

Alternatively, the tag seed rule refers to a rule containing the tag placeholder and the attribute of the tag placeholder. For example, "movies about xx, the part of speech of xx is noun." "XX" is the tag placeholder, and "noun" is the attribute of the tag placeholder in the rule. The historical search information includes a historical search sequence and a historical search result corresponding to the historical search sequence.

There are tags of a plurality of types. Thus, in any field, the tags cannot be listed one by one in a manual mode, and the method of manually listing the tags may not be able to cover a search sequence with a high click rate. Therefore, in this embodiment, starting from the search sequence, using the manually constructed tag seed rule containing the tag placeholder and the attribute of the tag placeholder, the tag seed rule is matched with the historical search sequence and the historical search result to determine the tag matching the tag seed rule.

For example, the seed tag rule "movies about xx, the part of speech of xx is noun" is constructed. The seed tag rule is matched with the historical search information. When the historical search sequence contains "movies about Andy Lau," it is determined that the tag matching the tag seed rule is "Andy Lau." When the historical search sequence contains "movies about love," it is determined that the tag is "love," until all historical search sequences are traversed.

Alternatively, in order to reduce the calculation amount of matching the tag and improve the accuracy, a tag set satisfying a preset condition may be filtered from historical search log files using the tag seed rule. The preset condition includes: a click rate of a page in the historical search result satisfies a preset threshold, the length of the historical search sequence satisfies a preset requirement, and the like.

It should be noted that the part-of-speech characteristic needs to be considered when the matching is performed on the tag. For example, "college entrance examination" and "suitable for the college entrance examination" are two different tags. A situation where the historical search sequence of the tag may contain a non-tag or a plurality of tags also needs to be considered. For the situation where the historical search sequence may contain the non-tag, the accuracy and efficiency of mining the tag may be improved by presetting a blacklist of tags or tag seed rules and removing a tag in the blacklist during the tag matching stage. For the situation where the historical search sequence may contain a plurality of tags, the plurality of tags may be split when the matching is performed on the tag. For example, "youth movies about encouragement on campus" is split into three tags "campus," "youth," and "encouragement." However, in order to ensure the acquisition of a corpus with a high click rate, the combination relationship is still preserved, and the plurality of tags are combined to query during a retrieval.

S120, combining the existing tag seed rule and the matching tag to construct a new search sequence set.

After the tag is determined based on the tag seed rule and the historical search information, the obtained tag is combined with the tag seed rule to construct the new search sequence set. For example, when the tag seed rule is "movies about xx, xx is a noun," and determined tags are love, comedy, Andy Lau, etc., new search sequences are constructed: "movies about love," "movies about comedy," "movies about Andy Lau" and so on. Alternatively, when the matching tag contains a plurality of tags, a new search sequence is constructed according to the split tags. For example, when the matching tag is "youth encouragement on campus," the tag is split into three tags "campus," "youth," and "encouragement," and three search sequences are constructed: "movies about campus," "movies about youth," and "movies about encouragement."

S130, performing a generalization process on search sequences included in the new search sequence set to obtain a new tag seed rule, and returning to perform an operation of matching the new tag seed rule with the historical search information to determine a new tag until the tag and the tag seed rule satisfy a convergence condition.

In this embodiment, the generalization may be performed on the search sequences using a query2query service, and the new tag seed rule is generalized from the search sequences, and the new tag is determined by matching the new tag seed rule with the historical search information. With this operation as a loop, the tag and the tag seed rule are iterated and upgraded until the tag and the tag seed rule satisfy the convergence condition. In addition, when there is a newly added tag, a search sequence may be constructed using the newly added tag and the existing tag seed rule, and the above operation is performed until the tag and the tag seed rule satisfy the convergence condition and a final tag is outputted. When a tag is altered, the process performed on the newly added tag can alter an output result corresponding to the altered tag, thereby achieving the real-time update of the tag.

The method for mining a tag in Embodiment 1 of the present disclosure is described below by examples. For example, the tag seed rule of "movies about XX" is constructed, and the tag seed rule is matched with the historical search information to obtain the tags such as love, comedy, and Andy Lau. The new search sequences are constructed as: "movies about love," "movies about comedy," "movies about Andy Lau," etc. Then, the generalization is performed on the new search sequences using the query2query service to obtain the new tag seed rule "movies about XX." The new tag seed rule "movies about XX" is matched with the historical search information to obtain the new tag "terror." Then, a search is performed using "movies about terror," and such iteration and update are performed until the outputted tag and the tag seed rule reach a stable convergence condition.

In the embodiment of the present disclosure, the method includes matching the tag seed rule containing the tag placeholder and the attribute of the tag seed rule with the historical search information to determine the matching tag; combining the existing tag seed rule and the matching tag to construct the new search sequence set; and performing the generalization on the search sequences included in the new search sequence set to obtain the new tag seed rule, and returning to perform an operation of matching on the new tag seed rule with the historical search information to determine the new tag until the tag and the tag seed rule satisfy the convergence condition. Therefore, a more comprehensive and profound tag can be mined, and the entire process of mining the tag is not dependent on a vertical website, and thus, the same process may be performed to mine tags of all entities in all fields, which significantly reduces working hours for development, and satisfies specific demands of users.

On the basis of the above solution, the performing a generalization process on search sequences included in the new search sequence set to obtain a new tag seed rule includes:

determining synonymous search sequences of the search sequences included in the new search sequence set, and extracting the new tag seed rule from the synonymous search sequences.

In this embodiment, a sequence matching rule may be preset. If some search sequences in the new search sequence set satisfy the sequence matching rule, the some search sequences are determined as the synonym search sequences, and the new tag seed rule is extracted based on the synonymous search sequences. The extracting the new tag seed rule using the synonymous search sequences can make the generalization result of the tag seed rule more accurate.

On the basis of the above solution, the determining synonymous search sequences of the search sequences included in the new search sequence set, and extracting the new tag seed rule from the synonymous search sequences includes:

for the each of the search sequences in the new search sequence set, if a number of identical pages in clicked search result pages of the search sequence and clicked search result pages of other search sequence is greater than a number threshold, determining the search sequence and the other search sequence as synonymous search sequences, and extracting the new tag seed rule from the synonymous search sequences based on a tag included in the search sequence.

Alternatively, the sequence matching rule is set to that the number of the identical pages in the clicked search result pages is greater than the number threshold. When a synonymous search sequence is filtered in the new search sequence set, one search sequence in the new search sequence set may be used as a basic search sequence. The clicked pages in search result pages corresponding to an other search sequences are compared with the clicked pages in search result pages corresponding to the basic search sequence, to determine the number of the identical pages in the clicked search result pages corresponding to the two search sequences. When the number of the identical pages is greater than a preset number threshold, it is determined that the search sequence and the basic search sequence are synonymous search sequences. Finally, the new tag seed rule is extracted from the synonym search sequences based on the tag contained in the basic search sequence. The number threshold may be determined according to the numbers of search result pages corresponding to the search sequences. The synonymous search sequences are determined through the number of the identical pages in the search result pages corresponding to the search sequences, which can ascertain whether different search sequences are synonymous search sequences with entities corresponding to the search sequences as a standard, so that the determination of the synonym search sequences is more accurate, and then the accuracy of the new tag seed rule extracted based on the synonym search sequences is improved.

For example, the new search sequence set contains "movies about gay" and "movies about boys' love." When the number of the identical clicked pages in the search result pages corresponding to the two search sequences is greater than the number threshold, it is determined that the two search sequences are synonymous search sequences. The new tag seed rule "movies about XX" is extracted using the tag "gay" and the two search sequences.

Embodiment 2

Figure 2:
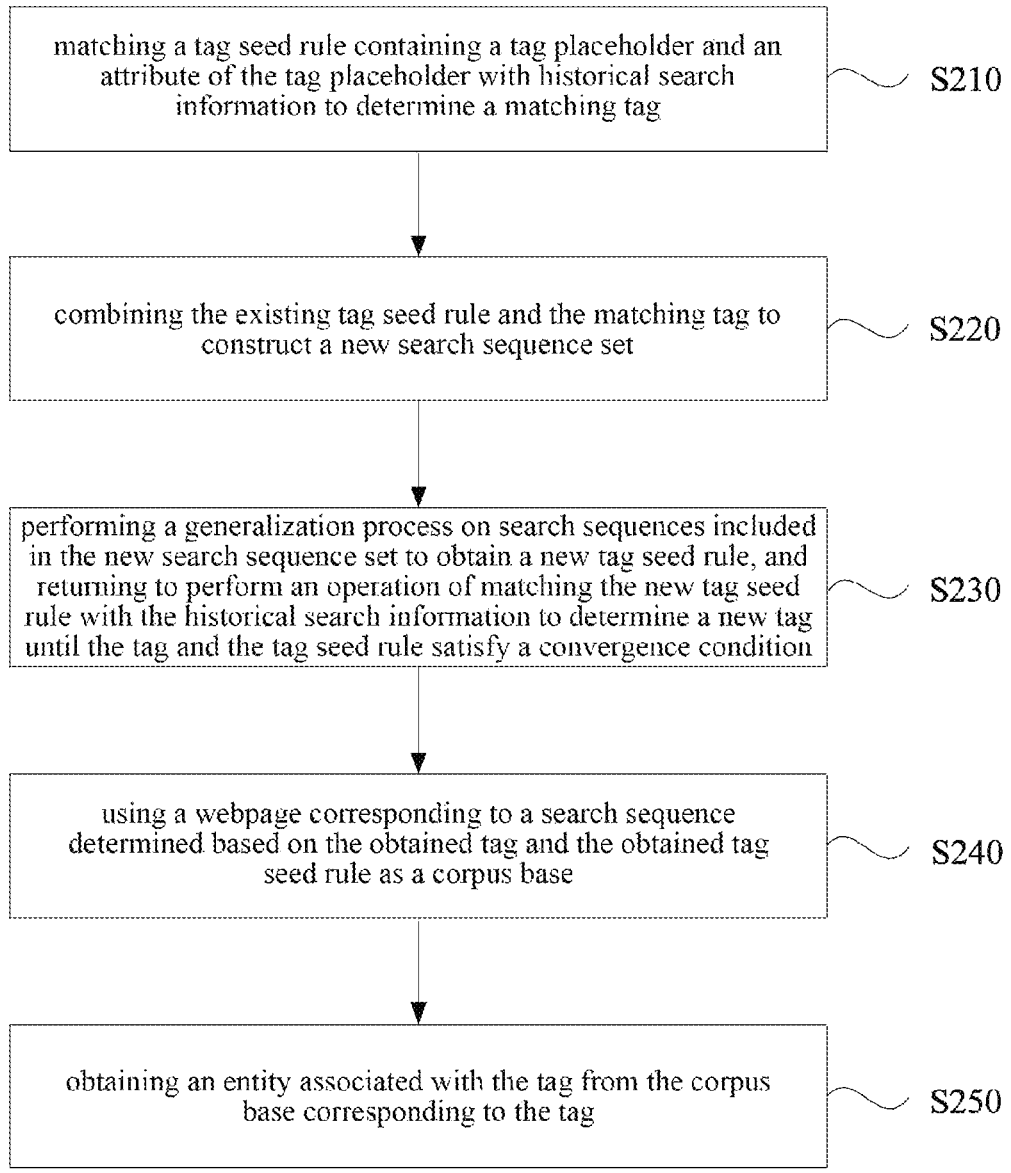
FIG. 2 is a flowchart of a method for mining a general tag according to Embodiment 2 of the present disclosure.

FIG. 2 is a flowchart of a method for mining a general tag according to Embodiment 2 of the present disclosure. This embodiment is further optimized on the basis of the above embodiment. As shown in FIG. 2, the method includes the following steps.

S210, matching a tag seed rule containing a tag placeholder and an attribute of the tag placeholder with historical search information to determine a matching tag.

S220, combining the existing tag seed rule and the matching tag to construct a new search sequence set.

S230, performing a generalization process on search sequences included in the new search sequence set to obtain a new tag seed rule, and returning to perform an operation of matching the new tag seed rule and the historical search information to determine a new tag until the tag and the tag seed rule satisfy a convergence condition.

S240, using a webpage corresponding to a search sequence determined based on the obtained tag and the obtained tag seed rule as a corpus base.

After the tag is determined, the corpus base needs to be constructed before an entity corresponding the tag is mined. In this embodiment, the search sequence is formed by the final tag and the final tag seed rule, the webpage corresponding to the search sequence is determined, and the determined webpage is used as the corpus base. In addition, when the webpage is a structured webpage, the webpage corresponding to the search sequence may also be acquired through a configuration template, and the corresponding relationship between the tag and the entity can be obtained at the same time, for example, the Douban webpage.

It should be noted that when the tag is a combined tag, a webpage corresponding to a search sequence constructed by the combined tag and the tag seed rule is classified into webpages corresponding to search sequences constructed by the split tags and the tag seed rule. A "tag-webpage" set is outputted under a quality control, a webpage library corresponding to the tags is outputted, and the webpage library is used as the corpus base.

S250, obtaining an entity associated with the tag from the corpus base corresponding to the tag.

In this embodiment, an entity extraction framework may be preset. The framework includes a common entity extraction template and an entity recognition strategy. The entity recognition strategy may be customized by a user. Based on an entity list inputted by the user, a corpus in the corpus base is inputted, the entity is extracted through the entity extraction framework. In addition, by using the webpage corresponding to the search sequence determined by the tag and the tag seed rule as the corpus base, in the obtained corpus base the tag has been associated with the webpage, and thus, the entity associated with the tag may be directly outputted. The obtaining the corpus base through a configuration template can output the tag by extracting structured webpages. The entity is associated with a set of existing tags, and the entity associated with the tag is outputted using the correlation between the tag and the entity.

On the basis of the above embodiment, the operation of constructing the corpus base corresponding to the tag and the operation of obtaining the entity associated with the tag from the corpus base are added into the technical solution according to the embodiment of the present disclosure. Using this method, on the basis of mining a more comprehensive and profound tag, the entity associated with the tag is accurately mined.

On the basis of the solution, after the obtaining an entity associated with the tag from the corpus base corresponding to the tag, the method further includes:

determining a relationship between a first tag and a second tag based on a relationship between an entity set associated with the first tag and an entity set associated with the second tag, wherein the relationship between the first tag and the second tag is a synonymous relationship or hyponymy relationship.

After the tag and its corresponding entity are determined, based on a relationship between entity sets corresponding to different tags, a relationship between the tags may be mined. The relationship between the tags may be the synonymous relationship or hyponymy relationship.

Alternatively, when the number of coincident entities in the entity set corresponding to the first tag and the entity set corresponding to the second tag exceeds a preset value, or a ratio of the number of the coincident entities in the entity set corresponding to the first tag and the entity set corresponding to the second tag to the total number of entities corresponding to the tags is greater than a preset first ratio, it is determined that the relationship between the tags is the synonymous relationship. When the entity set corresponding to the first tag contains entities corresponding to the second tag, and a ratio of the number of the contained entities to the total number of the entities corresponding to the second tag exceeds a preset second ratio, it is determined that the relationship between the tags is the hyponymy relationship, and the first tag is a superordinate tag of the second tag. In order to ensure the accuracy of the relationship between the tags, the relationship between the tags may be tested manually.

For example, most of the entities corresponding to the tag "gay" and the entities corresponding to the tag "boy's love" are coincident, it is determined that the relationship between the tag "gay" and the tag "boys' love" is the synonymous relationship. As another example, the entities corresponding to the tag "homoerotism" contain most of the entities corresponding to the tag "boys' love," it is determined that the relationship between the tag "homoerotism" and the tag "boys' love" is the hyponymy relationship, and the tag "homoerotism" is a superordinate tag of the tag "boys' love." The relationship between the tags is determined by mining the tags and the entities corresponding to the tags, which can make the structures of the tags clearer and more definite. When the search results are fed back to the user through the tags, a more accurate and comprehensive search result may be provided for the user based on the logical relationship between the tags.

In another implementation of the embodiment of the present disclosure, the relationship between the tags may also be determined by pre-constructing a dictionary and by matching the tags with the words in the dictionary. The dictionary may be a mutually exclusive dictionary, a synonym dictionary or a hyponymy word dictionary. By matching the tags with the words in the dictionary to determine the relationship between the tags, the automatic determination of the relationship between the tags can be realized.

Embodiment 3

Figure 3:
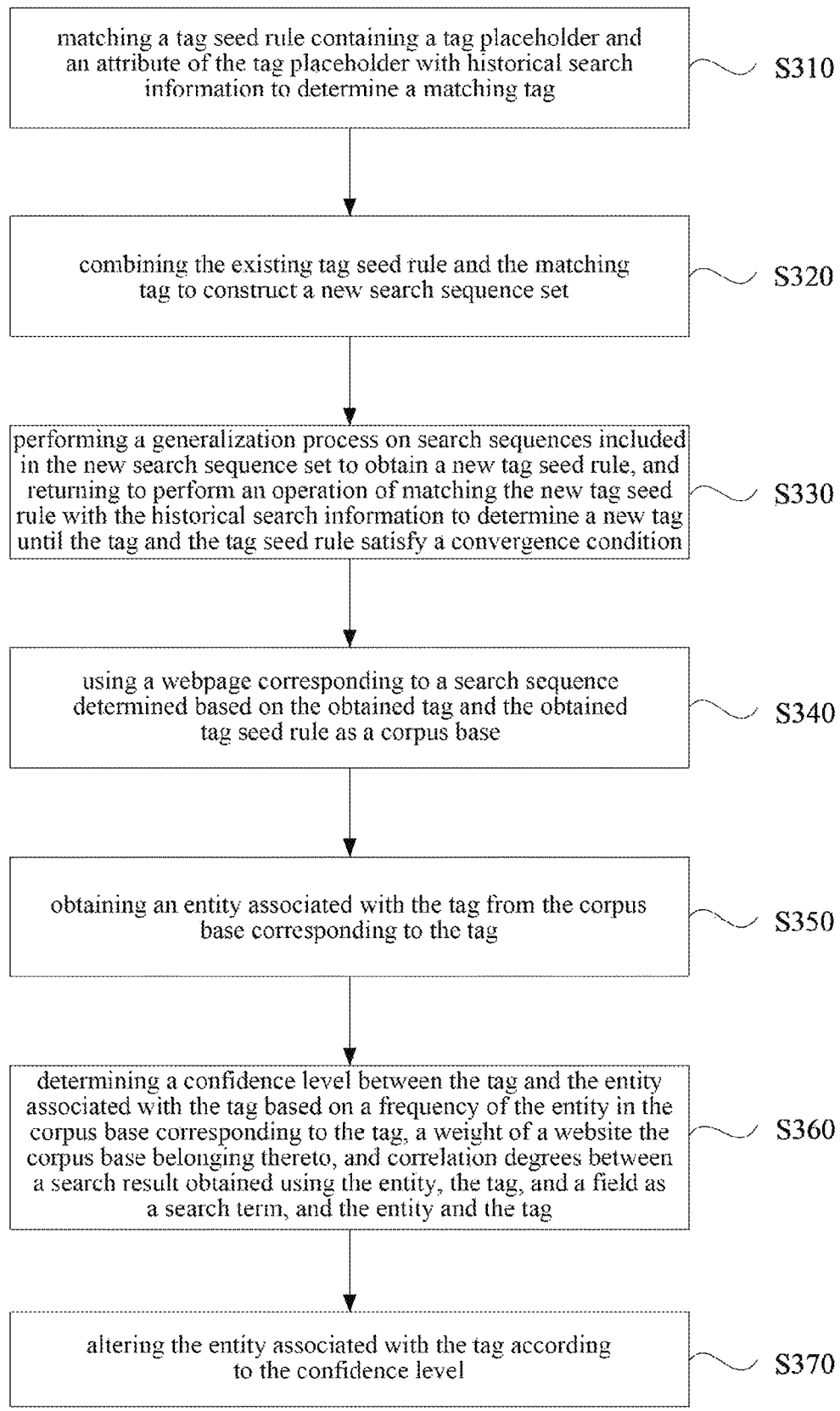
FIG. 3 is a flowchart of a method for mining a general tag according to Embodiment 3 of the present disclosure.

FIG. 3 is a flowchart of a method for mining a general tag according to Embodiment 3 of the present disclosure. This embodiment is further optimized on the basis of the above embodiments. As shown in FIG. 3, the method includes the following steps.

S310, matching a tag seed rule containing a tag placeholder and an attribute of the tag placeholder with historical search information to determine a matching tag.

S320, combining the existing tag seed rule and the matching tag to construct a new search sequence set.

S330, performing a generalization process on search sequences included in the new search sequence set to obtain a new tag seed rule, and returning to perform an operation of matching the new tag seed rule with the historical search information to determine a new tag until the tag and the tag seed rule satisfy a convergence condition.

S340, using a webpage corresponding to a search sequence determined based on the obtained tag and the obtained tag seed rule as a corpus base.

S350, obtaining an entity associated with the tag from the corpus base corresponding to the tag.

S360, determining a confidence level between the tag and the entity associated with the tag based on a frequency of the entity in the corpus base corresponding to the tag, a weight of a website the corpus base belonging thereto, and a correlation degree between a search result obtained using the entity, the tag, and a field as a search term, and the entity and the tag.

The approach of mining the tag and the corresponding entity of the tag is performed based on a strong correlation between the corpus base and the tag. However, after the iteration and update performed on the tag and the seed tag rule, and the rewriting on the search sequence, the entity corresponding to the determined tag may not be corresponding to the tag under the influence of a sorting strategy and an entity extraction strategy. Accordingly, it is necessary to calculate the confidence level between the tag and the entity associated with the tag to determine the accuracy of the entity. In this embodiment, the confidence level between the tag and the entity associated with the tag may be calculated in three dimensions.

On the one hand, the confidence level between the tag and the entity associated with the tag may be calculated through a frequency of the entity occurring in the corpus base. For example, according to the frequency of each entity occurring in the corpus base, a corresponding relationship between a frequency interval and the confidence level may be set, or the frequency of the each entity occurring in the corpus base is sorted, and the confidence level between the each entity and the tag is determined based on the sorting result.

On the other hand, by setting a weight of a website, the confidence level between the entity and the tag is calculated based on the weight of the website to which the entity belongs.

In the third aspect, a search may be performed again by using the entity, the tag and the field as the search term. The correlation degrees between the entity, the tag and the webpage is calculated based on semantics in a title and an abstract of a corresponding search result. The confidence level between the entity and the tag is calculated based on the correlation degrees.

Alternatively, the confidence level between the tag and the entity associated with the tag may be calculated at the above three dimensions. A weighted sum is obtained by setting the weights of the three dimensions. The finally calculated confidence level is used as the confidence level between the tag and the entity associated with the tag.

S370, altering the entity associated with the tag according to the confidence level.

Alternatively, after the confidence level between the tag and the entity associated with the tag is calculated, the entity associated with the tag is altered according to the confidence level between the tag and each of the entities. For example, a confidence level threshold may be preset. When a confidence level between the tag and the entity is lower than the confidence level threshold, the entity is removed from the entities corresponding to the tag. The confidence level threshold may be determined based on the distribution of values of the confidence levels between the tag and the entities.

According to the technical solution of the embodiment of the present disclosure, the operation of calculating the confidence level between the tag and the entity corresponding to the tag and the operation of altering the entity associated with the tag according to the confidence level are added on the basis of the above embodiments. Using this method, the corresponding relationship between the mined tag and entity can be corrected, so that the corresponding relationship between the tag and the entity is more accurate.

Embodiment 4

Figure 4:
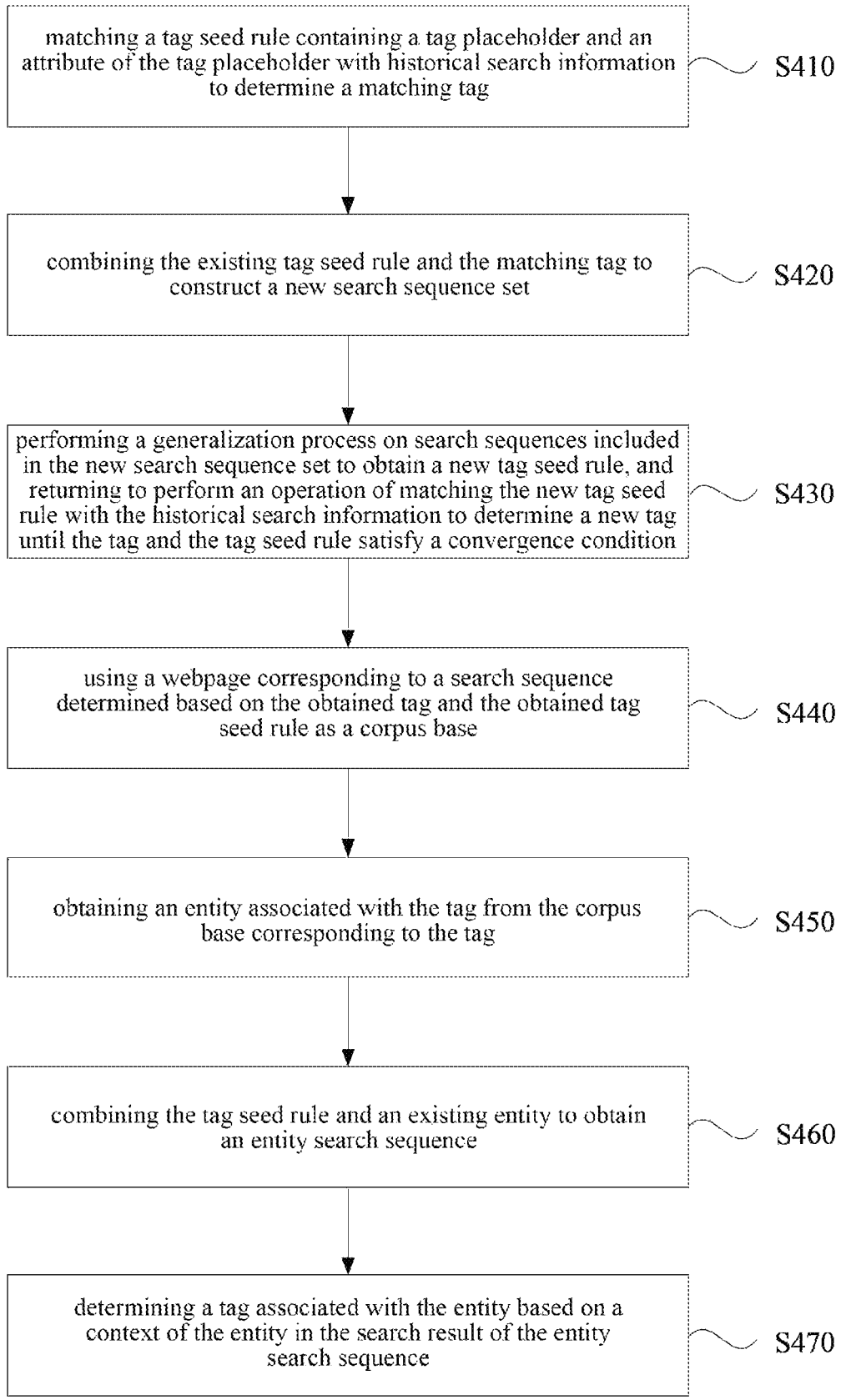
FIG. 4 is a flowchart of a method for mining a general tag according to Embodiment 4 of the present disclosure.

FIG. 4 is a flowchart of a method for mining a general tag according to Embodiment 4 of the present disclosure. This embodiment is further optimized on the basis of the above embodiments. As shown in FIG. 4, the method includes the following steps.

S410, matching a tag seed rule containing a tag placeholder and an attribute of the tag placeholder with historical search information to determine a matching tag.

S420, combining the existing tag seed rule and the matching tag to construct a new search sequence set.

S430, performing a generalization process on search sequences included in the new search sequence set to obtain a new tag seed rule, and returning to perform an operation of matching the new tag seed rule with the historical search information to determine a new tag until the tag and the tag seed rule satisfy a convergence condition.

S440, using a webpage corresponding to a search sequence determined based on the obtained tag and the obtained tag seed rule as a corpus base.

S450, obtaining an entity associated with the tag from the corpus base corresponding to the tag.

S460, combining the tag seed rule and the existing entity to obtain an entity search sequence.

In this embodiment, after the entity associated with the tag is obtained, a backward flow may be attempted to extract the tag corresponding to the entity using the entity and the tag seed rule.

Alternatively, the existing entity and the tag seed rule are combined to construct the corresponding entity search sequence, and the constructed entity search sequence is used to search to obtain the corresponding search result. The corresponding relationship between the entity and search result is established. The search result contains characteristic information such as a click rate of a webpage and a weight of the webpage.

For example, when the existing entity contains "Forrest Gump," and the tag seed rule is "movies about XX," "Forrest Gump" is combined with the tag seed rule to obtain the entity search sequence "movies about XX, Forrest Gump." The entity search sequence is used to search to obtain the search result. The corresponding relationship between "Forrest Gump" and the search result is established.

S470, determining the tag associated with the entity based on a context of the entity in the search result of the entity search sequence.

In this embodiment, the search results corresponding to the entity search sequence may be obtained, and the webpages corresponding to each of the search results. Based on a position and the contexts the entity in the search result, and the weight of the webpage corresponding to the search result, the tag and a score of the tag corresponding to the entity are calculated, and the tag is sorted according to the score. A tag having a score greater than a preset score is determined as the tag associated the entity. The preset score may be determined based on the distribution of the scores of the tags. In order to ensure the accuracy of the tag, the tag associated with the entity may be manually tested.

In addition, when there is a newly added entity, the entity search sequence may be constructed using the newly added entity and the existing tag seed rule. A search process is performed using the new entity search sequence to obtain the tag corresponding to the newly added entity.

According to the technical solution of this embodiment, the operation of determining the tag associated with the entity using the existing entity is added on the basis of the above embodiments. Using this method, on the basis of mining the tag and the entity associated with the tag, a backward verification is performed on the correlation between the tag and the entity, which makes the correlation between the tag and the entity more accurate.

Embodiment 5

Figure 5:
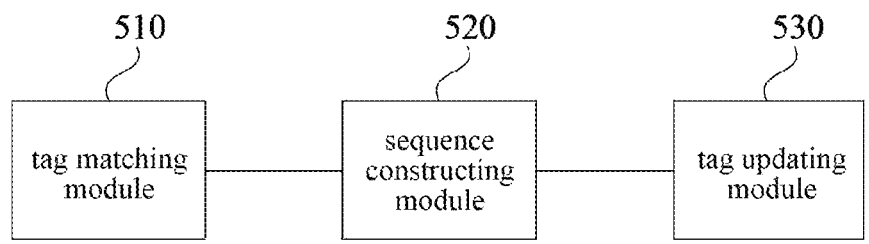
FIG. 5 is a schematic structural diagram of an apparatus for mining a general tag according to Embodiment 5 of the present disclosure.

FIG. 5 is a schematic structural diagram of an apparatus for mining a general tag according to Embodiment 5 of the present disclosure. The apparatus for mining a general tag may be implemented by means of software and/or hardware. For example, the apparatus for mining a general tag may be configured in a server. As shown in FIG. 5, the apparatus includes:

a tag matching module 510, configured to match a tag seed rule containing a tag placeholder and an attribute of the tag placeholder with historical search information to determine a matching tag;

a sequence constructing module 520, configured to combine the existing tag seed rule and the matching tag to construct a new search sequence set; and a tag updating module 530, configured to perform a generalization process on search sequences included in the new search sequence set to obtain a new tag seed rule, and return to perform an operation of matching the new tag seed rule with the historical search information to determine a new tag until the tag and the tag seed rule satisfy a convergence condition.

Further, the tag updating module 530 is configured to:

determine synonymous search sequences of the search sequences included in the new search sequence set, and extract the new tag seed rule from the synonymous search sequences.

Further, the tag updating module 530 is configured to:

for the each of the search sequences in the new search sequence set, if a number of identical pages in clicked search result pages of the search sequence and clicked search result pages of an other search sequence is greater than a number threshold, determine the search sequence and the other search sequence as synonymous search sequences, and extract the new tag seed rule from the synonymous search sequences based on a tag included in the search sequence.

Further, the apparatus further includes:

a corpus base determining module, configured to use a webpage corresponding to a search sequence determined based on the obtained tag and the obtained tag seed rule as a corpus base after returning to perform the matching operation on the new tag seed rule and the historical search information to determine the new tag until the tag and the tag seed rule satisfy the convergence condition; and an entity obtaining module, configured to obtain an entity associated with the tag from the corpus base corresponding to the tag.

Further, the apparatus further includes:

a confidence level defining module, configured to determine a confidence level between the tag and the entity associated with the tag based on a frequency of the entity in the corpus base corresponding to the tag, a weight of a website the corpus base belonging thereto, and correlation degreed between a search result obtained using the entity, the tag, and a field as a search term, and the entity and the tag, after obtaining the entity associated with the tag from the corpus base corresponding to the tag; and an entity alteration module, configured to alter the entity associated with the tag according to the confidence level.

Further, the apparatus further includes:

a relationship determining module, configured to determine a relationship between a first tag and a second tag based on a relationship between an entity set associated with the first tag and an entity set associated with the second tag, after obtaining the entity associated with the tag from the corpus base corresponding to the tag, wherein the relationship between the first tag and the second tag is a synonymous relationship or hyponymy relationship.

Further, the apparatus further includes:

a sequence combining module, configured to combine the tag seed rule and an existing entity to obtain an entity search sequence, after obtaining the entity associated with the tag from the corpus base corresponding to the tag; and a tag determining module, configured to determine a tag associated with the entity based on a context of the entity in a search result of the entity search sequence.

In the embodiment of the present disclosure, the apparatus includes the tag matching module configured to match the tag seed rule containing the tag placeholder and the attribute of the tag seed rule with the historical search information to determine the matching tag; the sequence constructing module, configured to combine the existing tag seed rule and the matching tag to construct the new search sequence set; and the tag updating module, configured to perform the generalization on the search sequences included in the new search sequence set to obtain the new tag seed rule, and return to perform an operation of matching the new tag seed rule with the historical search information to determine the new tag until the tag and the tag seed rule satisfy the convergence condition. Therefore, a more comprehensive and profound tag can be mined, and the entire flow of mining the tag is not dependent on a vertical website, and thus, tags of all entities in all fields may be mined using the same flow, which significantly reduces working hours for development, and satisfies specific demands of users.

The apparatus for mining a general tag provided by the embodiment of the present disclosure may perform the method for mining a general tag provided by any embodiment of the present disclosure, and possess functional modules for performing the method and corresponding beneficial effects.

Embodiment 6

Figure 6:
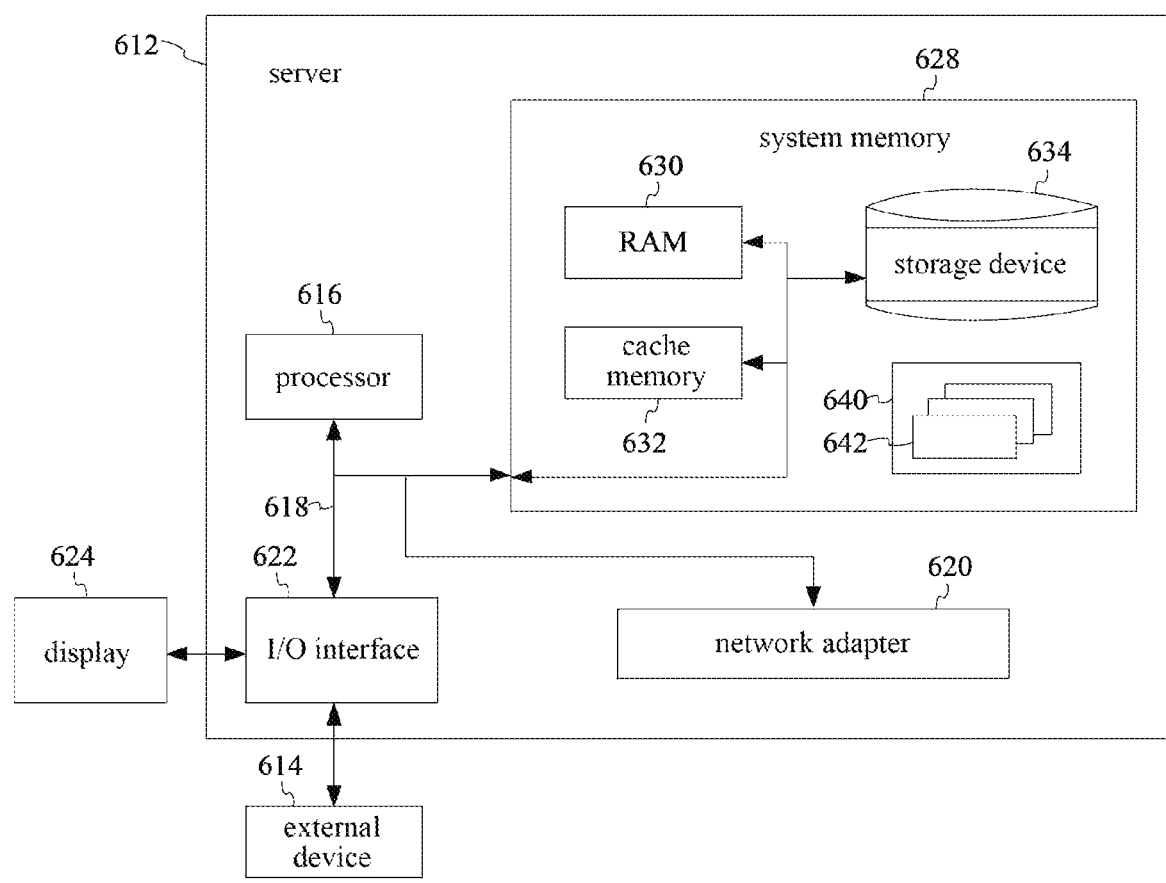
FIG. 6 is a schematic structural diagram of a server according to Embodiment 6 of the present disclosure.

FIG. 6 is a schematic structural diagram of a server according to Embodiment 6 of the present disclosure. FIG. 6 illustrates a block diagram of a server 612 adapted to implement the implementations of the present disclosure. The server shown in FIG. 6 is merely an example, and should not impose any limitation on the functions and the scope of use of the embodiments of the present disclosure.

As shown in FIG. 6, the server 612 is expressed in the form of a general-purpose computing device. Components of the server 612 may include, but are not limited to: one or more processors or a processing unit 616, a system memory 628, and a bus 618 connecting different system components (including the system memory X28 and the processing unit 616).

The bus 618 represents one or more bus structures, including a memory bus or a memory controller, a peripheral bus, a graphics acceleration port, a processor, or a local bus of any one of the bus structures. For example, the system structures include, but are not limited to, an industrial standard architecture (ISA) bus, a micro channel architecture (MAC) bus, an enhanced ISA bus, a Video Electronics Standards Association (VESA) local bus, and a peripheral component interconnection (PCI) bus.

The server 612 typically includes multiple computer system readable media. These medias may be any available media that can be accessed by the server 612, including volatile media, non-volatile media, removable media and non-removable media.

The system memory 628 may include a computer system readable medium in the form of a volatile memory, such as a random access memory (RAM) 630 and/or a cache memory 632. The device 612 may further include other removable/non-removeable, volatile/non-volatile computer system storage media. By way of example only, a storage system 634 may be used for reading from and writing in non-removable and non-volatile magnetic media (not shown in FIG. 6, usually known as a "hard drive"). Although not shown in FIG. 6, a disk drive for reading from and writing in a removable non-volatile disk (such as a "floppy disk") and an optical driver for reading from and writing in a removable non-volatile disk (such as CD-ROM, DVD-ROM or other optical media) may be provided. With such arrangements, each driver may be connected to the bus 18 through one or more data media interfaces. The memory 628 may include at least one program product, the program product has a set of (e.g., at least one) program module, and the program module is configured to execute the functions of the embodiments of the disclosure.

A program/utility tool 640 with a set of (at least one) program module 642 may be stored in, e.g., the memory 628. The program module 642 includes, but is not limited to, an operating system, one or more applications, other program modules, and program data. Each of these examples or a combination thereof may include implementation of a network environment. The program module 642 usually executes the functions and/or methods according to the embodiments of the disclosure.

The server 612 may also communicate with one or more external devices 614 (e.g., a keyboard, a pointing device, and a displayer 624), and may also communicate with one or more devices that enable a user to interact with the server 612, and/or communicates with any other device (e.g., a network card and a modem) that enables the server 612 to communicate with one or more of other computing devices. This communication may be performed through an input/output (I/O) interface 622. Moreover, the server 612 may further communicate with one or more networks (e.g., a local area network (LAN), a wide area network (WAN) and/or a public network such as the Internet) through a network adapter 620. As shown in the FIG. 6, the network adapter 620 communicates with other modules of the server 612 through the bus 618. It should be appreciated that, although not shown in the figure, other hardware and/or software modules may be used in conjunction with the server 612, including but not limited to: a microcode, a device driver, a redundancy processing unit, an external disk drive array, a RAID system, a tape driver, and a data backup storage system.

By executing a program stored in the system memory 628, the processor 616 performs various function applications and data processing, for example, the method for mining a general tag provided by the embodiments of the present disclosure. The method includes:

matching a tag seed rule containing a tag placeholder and an attribute of the tag placeholder with historical search information to determine a matching tag;

combining the existing tag seed rule and the matching tag to construct a new search sequence set; and performing a generalization process on search sequences included in the new search sequence set to obtain a new tag seed rule, and returning to perform an operation of matching the new tag seed rule with the historical search information to determine a new tag until the tag and the tag seed rule satisfy a convergence condition. Obviously, it may be understood by those skilled in the art that the processor may also implement the technical solution of the method for mining a general tag provided by any embodiment of the present disclosure.

Embodiment 7

Embodiment 7 of the present disclosure further provides a computer readable storage medium storing a computer program. The program, when executed by a processor, implements the method for mining a general tag provided by the embodiments of the present disclosure. The method includes:

matching a tag seed rule containing a tag placeholder and an attribute of the tag placeholder with historical search information to determine a matching tag;

combining the existing tag seed rule and the matching tag to construct a new search sequence set; and performing a generalization process on search sequences included in the new search sequence set to obtain a new tag seed rule, and returning to perform an operation of matching the new tag seed rule with the historical search information to determine a new tag until the tag and the tag seed rule satisfy a convergence condition. Obviously, the embodiment of the present disclosure provides the computer readable storage medium. The computer program stored on the computer readable storage medium is not limited to the operations in the method, and may also perform related operations in the method for mining a general tag provided by any embodiment of the present disclosure.

The computer storage medium according to the embodiments of the disclosure may use any combination of one or more computer readable medium. The computer readable medium may be a computer readable signal medium or a computer readable storage medium. The computer readable storage medium may bey, for example but not limited to, an electric, magnetic, optical, electromagnetic, IR or semiconductor system, device or unit, or any combination thereof. More specific examples (non-exhaustive list) of the computer readable storage medium include: an electrical connection having one or more wires, a portable computer disk, a hard disk, a random access memory (RAM), a read only memory (ROM), an erasable programmable read only memory (EPROM or flash memory), an optical fiber, a portable compact disk read only memory (CD-ROM), an optical storage device, a magnetic storage device, or any appropriate combination thereof. Herein, the computer readable storage medium may be any tangible medium containing or storing programs, which may be used by an instruction execution system, device or unit, or a combination thereof.

The computer readable signal medium may be a data signal included in the baseband or transmitted as a part of carrier wave, and carries computer readable program codes. The data signal may be transmitted in multiple forms, including but not limited to an electromagnetic signal, an optical signal or any appropriate combination thereof. The computer readable signal medium may also be any computer readable medium rather than a computer readable storage medium, and the computer readable medium may send, spread or transmit programs to be used by an instruction execution system, device or unit, or a combination thereof.

Program codes contained in the computer readable medium may be transmitted using any suitable medium, including but not limited to: wireless, wire, cable, RF, etc., or any appropriate combination thereof.

A computer program code for executing the operations according to some embodiments of the disclosure may be written in one or more programming languages or a combination thereof. The programming language includes an object-oriented programming language, such as Java, Smalltalk and C++, and further includes a general procedural programming language, such as "C" language or a similar programming language. The program codes may be executed entirely on a computer of a user, executed partially on a computer of a user, executed as a standalone package, executed partially on the computer of the user and partially on a remote computer, or executed entirely on the remote computer or a server. When the remote computer is involved, the remote computer may be connected to a user computer through any type of network, including a local area network (LAN) or a wide area network (WAN), or be connected to an external computer (e.g., connected through Internet provided by an Internet service provider).

It is to be noted that the foregoing embodiments are merely preferred embodiments of the present disclosure, and the technical principles used thereby. Persons skilled in the art may understand that the present disclosure is not limited to the specific embodiments described herein. Persons skilled in the art may make various obvious changes, readjustments and substitutions without departing from the protection scope of the present disclosure. Therefore, although reference is made to the present disclosure in more detail in the foregoing embodiments, the present disclosure is not merely limited to the foregoing embodiments, more additional equivalent embodiments may be further included without departing from the conception of the present disclosure. The scope of the present disclosure is determined by the scope of the appended claims.

What is claimed is:

1. A method for mining a general tag, comprising:
    a matching operation of matching a tag seed rule containing a tag placeholder and an attribute of the tag placeholder with historical search information to determine a matching tag, wherein a tag is used in a knowledge graph to describe an attribute of an entity characteristic;
    a combining operation of combining the existing tag seed rule and the matching tag to construct a new search sequence set, the combining comprising: adding the determined matching tag to a place held by the tag placeholder in the tag seed rule, to construct the new search sequence set;
    a generalization operation of performing a generalization process on search sequences included in the new search sequence set to obtain a new tag seed rule; and
    returning to repeat the matching operation, the combining operation and the generalization operation with the obtained new tag seed rule as the tag seed rule, to iteratively update the determined matching tag and the tag seed rule until the determined matching tag and the obtained new tag seed rule satisfy a convergence condition,
    wherein the method further comprises:
        obtaining an entity set based on the obtained tag and the obtained new tag seed rule; and
        determining a relationship between a first tag and a second tag based on a relationship between the entity set associated with the first tag and an entity set associated with the second tag, wherein the relationship between the first tag and the second tag is a synonymous relationship or hyponymy relationship if the ratio of the number of coincident entities between the first tag and the second tag exceeds a preset value,
    wherein the method is performed by at least one processor.

2. The method according to claim 1, wherein the performing a generalization process on search sequences included in the new search sequence set to obtain a new tag seed rule comprises:
    determining synonymous search sequences of the search sequences included in the new search sequence set, and extracting the new tag seed rule from the synonymous search sequences.

3. The method according to claim 2, wherein the determining synonymous search sequences of the search sequences included in the new search sequence set, and extracting the new tag seed rule from the synonymous search sequences comprises:
    for the each of the search sequences in the new search sequence set, if a number of identical pages in clicked search result pages of the search sequence and clicked search result pages of an other search sequence is greater than a number threshold, determining the search sequence and the other search sequence as synonymous search sequences, and extracting the new tag seed rule from the synonymous search sequences based on a tag included in the search sequence.

4. The method according to claim 1, wherein after the determined matching tag and the obtained new tag seed rule satisfy the convergence condition, the method further comprises:
    using a webpage corresponding to a search sequence determined based on the obtained tag and the obtained new tag seed rule as a corpus base; and
    obtaining an entity associated with the tag from the corpus base corresponding to the tag.

5. The method according to claim 4, wherein after the obtaining an entity associated with the obtained matching tag from the corpus base corresponding to the obtained matching tag, the method further comprises:
    determining a confidence level between the tag and the entity associated with the tag based on a frequency of the entity in the corpus base corresponding to the tag, a weight of a website the corpus base belonging thereto, and correlation degrees between a search result obtained using the entity, the tag, and a field as a search term, and the entity and the tag; and
    altering the entity associated with the tag according to the confidence level.

6. The method according to claim 4, wherein after the obtaining an entity associated with the tag from the corpus base corresponding to the tag, the method further comprises:
    combining the tag seed rule and an existing entity to obtain an entity search sequence; and
    determining a tag associated with the entity based on a context of the entity in a search result of the entity search sequence.

7. An apparatus for mining a general tag, comprising:
    at least one processor; and
    a memory storing instructions, the instructions when executed by the at least one processor, cause the at least one processor to perform operations, the operations comprising:
        a matching operation of matching a tag seed rule containing a tag placeholder and an attribute of the tag placeholder with historical search information to determine a matching tag, wherein a tag is used in a knowledge graph to describe an attribute of an entity characteristic;

a combining operation of combining the existing tag seed rule and the matching tag to construct a new search sequence set, the combining comprising: adding the determined matching tag to a place held by the tag placeholder in the tag seed rule, to construct the new search sequence set;

a generalization operation of performing a generalization process on search sequences included in the new search sequence set to obtain a new tag seed rule; and returning to repeat the matching operation, the combining operation and the generalization operation with the obtained new tag seed rule as the tag seed rule, to iteratively update the determined matching tag and the tag seed rule until the determined matching tag and the obtained new tag seed rule satisfy a convergence condition wherein the operations further comprise:
  obtaining an entity set based on the obtained tag and the obtained new tag seed rule; and
  determining a relationship between a first tag and a second tag based on a relationship between the entity set associated with the first tag and an entity set associated with the second tag, wherein the relationship between the first tag and the second tag is a synonymous relationship or hyponymy relationship if the ratio of the number of coincident entities between the first tag and the second tag exceeds a preset value.

8. The apparatus according to claim 7, wherein the performing a generalization process on search sequences included in the new search sequence set to obtain a new tag seed rule comprises:
  determining synonymous search sequences of the search sequences included in the new search sequence set, and extract the new tag seed rule from the synonymous search sequences.

9. The apparatus according to claim 8, wherein the determining synonymous search sequences of the search sequences included in the new search sequence set, and extracting the new tag seed rule from the synonymous search sequences comprises:
  for the each of the search sequences in the new search sequence set, if a number of identical pages in clicked search result pages of the search sequence and clicked search result pages of an other search sequence is greater than a number threshold, determining the search sequence and the other search sequence as synonymous search sequences, and extract the new tag seed rule from the synonymous search sequences based on a tag included in the search sequence.

10. The apparatus according to claim 7, wherein after the determined matching tag and the obtained new tag seed rule satisfy the convergence condition, the operations further comprise:
  using a webpage corresponding to a search sequence determined based on the obtained tag and the obtained new tag seed rule as a corpus base; and
  obtaining an entity associated with the tag from the corpus base corresponding to the tag.

11. The apparatus according to claim 10, wherein after the obtaining an entity associated with the obtained matching tag from the corpus base corresponding to the obtained matching tag, the operations further comprise:

determining a confidence level between the tag and the entity associated with the tag based on a frequency of the entity in the corpus base corresponding to the tag, a weight of a website the corpus base belonging thereto, and correlation degrees between a search result obtained using the entity, the tag, and a field as a search term, and the entity and the tag; and altering the entity associated with the tag according to the confidence level.

12. The apparatus according to claim 10, after the obtaining an entity associated with the tag from the corpus base corresponding to the tag, the operations further comprise:
  combining the tag seed rule and an existing entity to obtain an entity search sequence, after obtaining the entity associated with the tag from the corpus base corresponding to the tag; and
  determining a tag associated with the entity based on a context of the entity in a search result of the entity search sequence.

13. A non-transitory computer readable storage medium storing a computer program, wherein the computer program, when executed by a processor, cause the processor to perform operations, the operations comprising:
  a matching operation of matching a tag seed rule containing a tag placeholder and an attribute of the tag placeholder with historical search information to determine a matching tag, wherein a tag is used in a knowledge graph to describe an attribute of an entity characteristic;
  a combining operation of combining the existing tag seed rule and the matching tag to construct a new search sequence set, the combining comprising: adding the determined matching tag to a place held by the tag placeholder in the tag seed rule, to construct the new search sequence set;
  a generalization operation of performing a generalization process on search sequences included in the new search sequence set to obtain a new tag seed rule; and
  returning to repeat the matching operation, the combining operation and the generalization operation with the obtained new tag seed rule as the tag seed rule, to iteratively update the determined matching tag and the tag seed rule until the determined matching tag and the obtained new tag seed rule satisfy a convergence condition,
  wherein the operations further comprise:
    obtaining an entity set based on the obtained tag and the obtained new tag seed rule; and
    determining a relationship between a first tag and a second tag based on a relationship between the entity set associated with the first tag and an entity set associated with the second tag, wherein the relationship between the first tag and the second tag is a synonymous relationship or hyponymy relationship if the ratio of the number of coincident entities between the first tag and the second tag exceeds a preset value.

14. The method according to claim 1, wherein the tag comprises a noun, a phrase, or a sentence including a subject, a predicate, and an object.

15. The method according to claim 1, wherein the historical search information comprises a historical search sequence and a historical search result corresponding to the historical search sequence.

16. The method according to claim 1, wherein the matching includes presetting a blacklist of tags and removing a tag in the blacklist.

* * * * *